Patented Feb. 21, 1928.

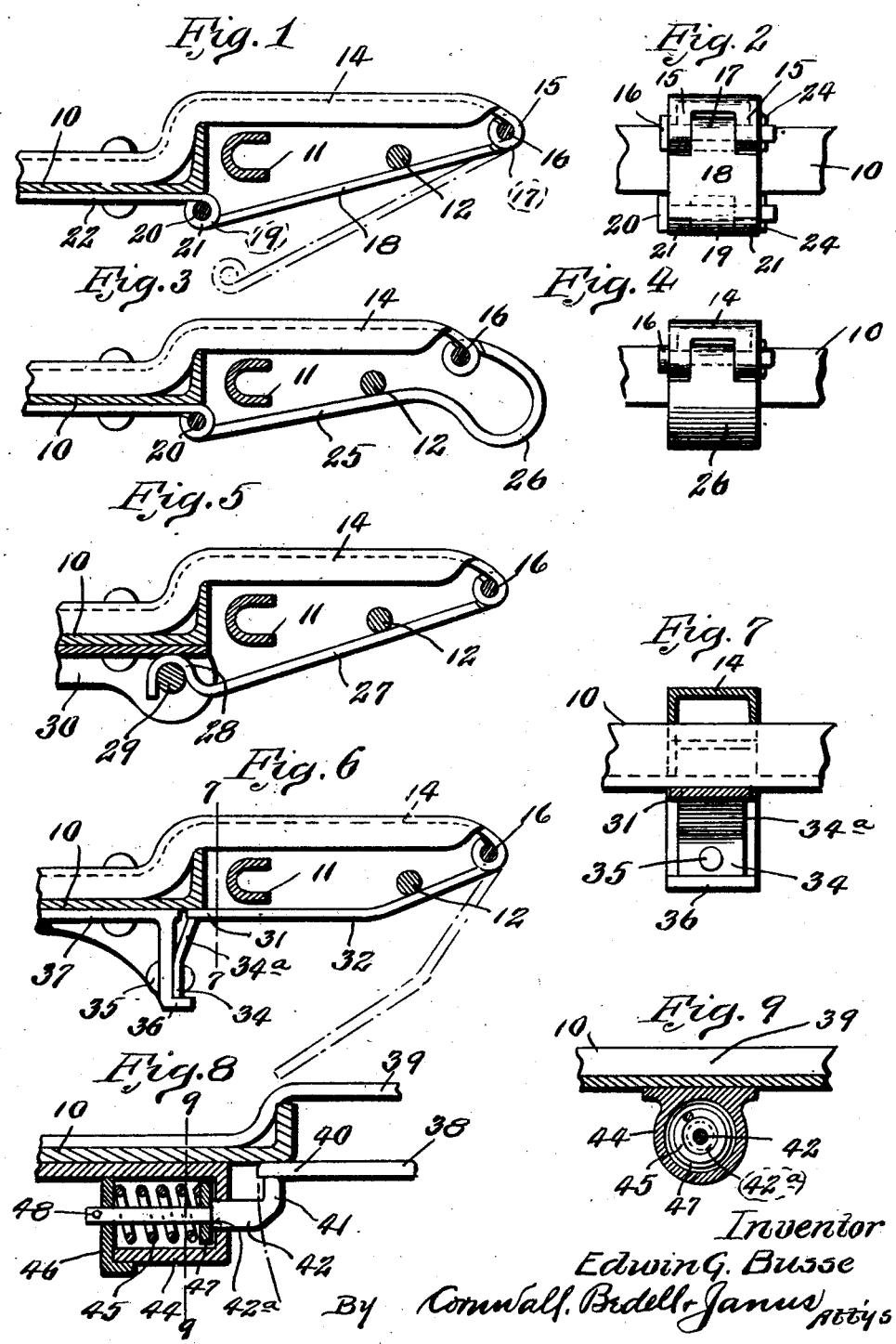

1,659,855

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM SUPPORT.

Application filed October 11, 1924. Serial No. 743,134.

This invention relates to new and useful improvements in brake beam supports, and the objects of the invention are to provide a simple and efficient support for brake beams which can be easily installed and can be economically manufactured.

Further objects of the invention are to provide a brake beam support having a track member pivotally supported at one end and having its opposite end releasably supported whereby said member when released can be swung on its pivot to permit ready access to the brake beam.

Other objects of the invention are to provide automatic means for engaging and locking the free end of said track member in operative position.

With these and other objects in view, my invention consists in certain novel features of construction and arrangement of parts, hereinafter more fully described and claimed, and illustrated in the accompanying drawings, in which—

Figure 1 is a side elevational view of one form of my invention.

Figure 2 is an end elevational view of the same.

Figure 3 is a side elevational view of a modified form of my invention.

Figure 4 is an end elevational view of same.

Figure 5 is a side elevational view of another modified form of my invention.

Figure 6 is a side elevational view of a modified form showing automatic means for locking the free end of the track member in position.

Figure 7 is a vertical cross section taken on line 7—7 of Figure 6.

Figure 8 shows a modified form of locking means.

Figure 9 is a vertical cross section taken on line 9—9 of Figure 8.

In the present invention the support consists of two members, one of which is permanently fixed to a part of a car truck and overhangs the brake beam and the other one of said members is disposed under the brake beam and has one end pivotally supported, preferably by the first member, and has its opposite end held in operative position by a suitable locking device which is preferably carried by the car truck part.

Referring by numerals to the accompanying drawings, 10 indicates a car truck part, such as a spring plank, 11 designates a compression member or rear end of a brake beam, and 12 a tension member or forward end of a brake beam.

A supporting member 14, preferably of rigid construction, is fixed to the upper face of said spring plank and extends over and above the brake beam and terminates in a tubular portion 15 in which is mounted a pin 16. This pin forms a pivotal mounting for the outer end 17 of a track or support member 18 which extends under said brake beam and has its rear end 19 secured by a pin 20 to one end 21 of a bracket 22 which is secured to the underside of the spring plank. Pin 20 is removably disposed in end 21 and can be removed, thereby releasing end 19 of member 18 so that the latter can be moved or swung away from the brake beam. Pins 16 and 20 are preferably locked against displacement by cotter pins 24. Member 18 may be either rigid or yielding.

In the form shown in Figures 3 and 4, a resilient track member 25 is provided in its length with a loop portion 26 which provides greater resiliency for said track member.

The form disclosed in Figure 5 shows a track member 27 provided at its rear end with a seat 28 adapted to be engaged by a pin 29 which is removably carried by a bracket 30.

The form shown in Figures 6 and 7 discloses an automatic means for locking and supporting the free end 31 of a track member 32. This means consists of a flat spring member 34 secured at 35 to an extension 36 of a bracket 37 and having its upper portion 34ª bent away from bracket 37 and engaging the underside of end 31 of track member 32. Thus the track member 32 is locked in operative position when moved upwardly toward the spring plank and to release the same, spring 34 is pressed toward bracket 37, thereby freeing end 31 so that member 32 can swing downwardly with pin 16 as the pivot.

In the form shown in Figures 8 and 9, a track member 38 is pivotally supported at one end by a resilient supporting member 39, which latter is fixed to the upper face of spring plank 10. The free end 40 of member 38 is adapted to be engaged by an upwardly presented portion 41 of a horizontally disposed member 42 which is slidably mounted in a housing 44 carried by the underside of the spring plank. A coil spring 45 is arranged in said housing and one end of said spring rests against a stationary plate 46 carried by the inner end of said housing and the opposite end of said spring bears against a follower plate 47 which is carried by member 42 and rests against a shoulder 42ª formed thereon. Thus member 42 is yieldingly movable in one direction to displace portion 41, whereby member 38 can be moved into and held in operative position or released therefrom.

A device constructed in accordance with my invention is simple in construction, has its track member displaceably mounted whereby the brake beam can be installed or removed without the necessity of disassembling the parts of the device from each other or from the truck part on which they are mounted, and the track member can be easily detached and replaced.

While I have shown and described the supporting member as rigid and the track member as flexible, if desired this may be reversed, or both members may be made flexible. It will be readily understood that minor changes in the construction and arrangement of parts of my improved support can be made and substituted for those herein shown, without departing from the spirit of my invention.

I claim:

1. A support for brake beams comprising in combination with a car truck part, a supporting member fixedly mounted thereon and extending over a brake beam, a flexible track member pivotally connected at one end to said supporting member, and a manually movable element for engaging the inner end of said track member in fixed relation with said car truck part.

2. In a car truck construction, the combination of a car truck part, a supporting member fixed thereto and extending over a brake beam, a resilient track member, a pin for pivotally engaging the outer end of said track member to said supporting member, and a manually displaceable member for engaging and locking the opposite end of said track member in operative position independently of said supporting member.

3. In a car truck construction, the combination with a car truck part, of a support for brake beams including a track member pivotally supported at one end, and manually displaceable means carried by said car truck part for engaging and supporting the inner end of said track member in operative position.

4. In a car truck construction, the combination with a car truck part, of a support for brake beams including a track member pivotally supported at one end, and yielding means for engaging the opposite end of said track member and maintaining said track member in operative position.

5. In a car truck construction, the combination with a car truck part, of a support for brake beams including a track member pivotally supported at one end, a mounting fixed to said car truck part, and a spring member carried by said mounting for engaging the free end of said track member and locking it in operative position.

6. In a brake beam support, the combination with a displaceable track member pivotally supported at one end, of a spring actuated member for engaging the other end of said track member and retaining it in operative position.

7. In a brake beam support, the combination with a displaceable track member pivotally supported at one end, of automatic means for engaging the other end of said track member as it is moved into functioning position and retaining it in its operative position.

8. In a brake beam support, the combination with a displaceable track member pivotally supported at one end, of a spring member for automatically engaging the other end of said track member as it is moved into functioning position and locking it in operative position.

9. In a brake beam support, the combination with a pivotally mounted track member, of yielding means engageable by the free end of said track member for automatically engaging and locking said track member as it is moved into functioning position in operative position.

10. A support for brake beams comprising a supporting member adapted to be fixed to a car truck part and provided with a bearing, a pin seated in said bearing, a yielding track member pivotally engaging said pin, and manually releasable means for detachably engaging and locking the other end of said track member.

11. In combination, a car truck part, a brake beam support member, means movably mounting said member at a point spaced from said car truck part, and means on said truck part for automatically engaging said member as it is moved into functioning position.

12. In combination, a car truck part, a brake beam support member, means pivotally mounting said member at a point spaced from said car truck part, and means on said truck part for automatically engaging said member as it is moved into functioning position.

13. A brake beam support comprising a member adapted to be fixed to a truck part and to extend over a brake beam, an element engaging the unfixed end of said member and adapted to extend under said beam and to be moved relatively to said member, without disengagement therefrom, to a position in which said beam may be removed from the support, and means for securing said element to said truck part, said means being releasable without affecting said member.

14. A support for brake beams comprising a member adapted to be fixed to a car truck part, and a supporting element permanently assembled at one end with said member and having its opposite end detachably supported adjacent to said truck part.

15. A support for brake beams comprising a member adapted to extend outwardly from a car truck part and above the brake beam, and a supporting element pivotally secured to the outer end of said member and extending inwardly therefrom under the brake beam, and releasable means for supporting the inner end of said element and permitting the same to be moved from beam supporting position without disassembly from said member.

In testimony whereof I hereunto affix my signature this 6th day of October, 1924.

EDWIN G. BUSSE.